(12) United States Patent
Stefan et al.

(10) Patent No.: US 7,908,461 B2
(45) Date of Patent: Mar. 15, 2011

(54) CELLULAR ENGINE FOR A DATA PROCESSING SYSTEM

(75) Inventors: Gheorghe Stefan, Manchester, NH (US); Dan Tomescu, Richmond Hill (CA)

(73) Assignee: Allsearch Semi, LLC, Bannockburn, IL (US)

( * ) Notice: Subject to any disclaimer, the term of this patent is extended or adjusted under 35 U.S.C. 154(b) by 545 days.

(21) Appl. No.: 12/004,120

(22) Filed: Dec. 19, 2007

(65) Prior Publication Data

US 2008/0126757 A1    May 29, 2008

Related U.S. Application Data

(62) Division of application No. 10/727,811, filed on Dec. 4, 2003, now Pat. No. 7,383,421.

(60) Provisional application No. 60/431,154, filed on Dec. 5, 2002.

(51) Int. Cl.
*G06F 9/00* (2006.01)
(52) U.S. Cl. ......................................... 712/22
(58) Field of Classification Search .................. 712/22
See application file for complete search history.

(56) References Cited

U.S. PATENT DOCUMENTS

| | | | |
|---|---|---|---|
| 3,308,436 A | 3/1967 | Borck, Jr. et al. | 340/172.5 |
| 4,212,076 A | 7/1980 | Conners | 364/706 |
| 4,575,818 A | 3/1986 | Almy et al. | 365/49.17 |
| 4,780,811 A | 10/1988 | Aoyama et al. | 712/3 |
| 4,783,738 A | 11/1988 | Li et al. | 364/200 |
| 4,873,626 A | 10/1989 | Gifford | 364/200 |
| 4,876,644 A | 10/1989 | Nuechterlein et al. | 364/200 |
| 4,907,148 A | 3/1990 | Morton | 712/22 |
| 4,922,341 A | 5/1990 | Strobach | |
| 4,943,909 A | 7/1990 | Huang | |
| 4,983,958 A | 1/1991 | Carrick | 345/570 |
| 4,992,933 A | 2/1991 | Taylor | |
| 5,122,984 A | 6/1992 | Strehler | 365/49.1 |
| 5,150,430 A | 9/1992 | Chu | 382/246 |
| 5,228,098 A | 7/1993 | Crinon et al. | |
| 5,241,635 A | 8/1993 | Papadopoulos et al. | 395/375 |
| 5,319,762 A | 6/1994 | Mayer | 711/108 |
| 5,329,405 A | 7/1994 | Hou et al. | 707/6 |
| 5,373,290 A | 12/1994 | Lempel et al. | 341/51 |

(Continued)

FOREIGN PATENT DOCUMENTS

EP        710026 A2        1/1996

(Continued)

OTHER PUBLICATIONS

Office Action for U.S. Appl. No. 11/584,480, mailed Apr. 23, 2008, 8 pages.

(Continued)

*Primary Examiner* — Alford W Kindred
*Assistant Examiner* — Benjamin P Geib
(74) *Attorney, Agent, or Firm* — Haverstock & Owens, LLP

(57) ABSTRACT

A data processing system includes an associative memory device containing n-cells, each of the n-cells includes a processing circuit. A controller is utilized for issuing one of a plurality of instructions to the associative memory device, while a clock device is utilized for outputting a synchronizing clock signal comprised of a predetermined number of clock cycles per second. The clock device outputs the synchronizing clock signal to the associative memory device and the controller which globally communicates one of the plurality of instructions to all of the n-cells simultaneously, within one of the clock cycles.

24 Claims, 5 Drawing Sheets

U.S. PATENT DOCUMENTS

| | | |
|---|---|---|
| 5,440,753 A | 8/1995 | Hou et al. ............... 711/108 |
| 5,446,915 A | 8/1995 | Pierce .................... 395/800 |
| 5,448,733 A | 9/1995 | Satoh et al. ............. 710/110 |
| 5,450,599 A | 9/1995 | Horvath et al. .......... 395/800 |
| 5,490,264 A | 2/1996 | Wells et al. ............. 711/154 |
| 5,497,488 A | 3/1996 | Akizawa et al. ............ 707/6 |
| 5,602,764 A | 2/1997 | Eskandari-Gharnin ...... 708/210 |
| 5,631,849 A | 5/1997 | Wallace .............. 364/999.999 |
| 5,640,582 A | 6/1997 | Hays et al. ............... 712/38 |
| 5,682,491 A | 10/1997 | Pechanek et al. ......... 395/385 |
| 5,706,290 A | 1/1998 | Shaw et al. |
| 5,758,176 A | 5/1998 | Agarwal et al. ........... 712/26 |
| 5,818,873 A | 10/1998 | Wall et al. ............... 375/340 |
| 5,822,608 A | 10/1998 | Dieffenderfer et al. .... 395/800.2 |
| 5,828,593 A | 10/1998 | Schultz et al. .......... 365/49.18 |
| 5,867,598 A | 2/1999 | De Queiroz ............. 382/235 |
| 5,870,619 A | 2/1999 | Wilkinson et al. ........ 395/800.2 |
| 5,909,686 A | 6/1999 | Muller et al. ............ 707/104.1 |
| 5,951,672 A | 9/1999 | Kwok et al. |
| 5,963,210 A | 10/1999 | Lewis et al. ............. 345/419 |
| 5,963,746 A | 10/1999 | Barker et al. ........... 395/800.2 |
| 6,073,185 A | 6/2000 | Meeker |
| 6,085,283 A | 7/2000 | Toda .................... 711/104 |
| 6,088,044 A | 7/2000 | Kwok et al. ............. 345/505 |
| 6,089,453 A | 7/2000 | Kayser et al. ............ 235/383 |
| 6,119,215 A | 9/2000 | Key et al. |
| 6,128,720 A | 10/2000 | Pechanek et al. ........ 712/20 |
| 6,145,075 A | 11/2000 | Henry et al. ............. 712/225 |
| 6,173,386 B1 | 1/2001 | Key et al. ............... 712/10 |
| 6,212,237 B1 | 4/2001 | Minami et al. ......... 375/240.16 |
| 6,226,710 B1 | 5/2001 | Melchior ................ 711/108 |
| 6,269,354 B1 | 7/2001 | Arathorn ................ 706/27 |
| 6,295,534 B1 | 9/2001 | Mann .................... 707/10 |
| 6,317,819 B1 | 11/2001 | Morton .................. 712/22 |
| 6,336,178 B1 | 1/2002 | Favor et al. ............. 712/23 |
| 6,337,929 B1 | 1/2002 | Kajiwara et al. |
| 6,389,446 B1 | 5/2002 | Torii |
| 6,405,302 B1 | 6/2002 | Ohsuga et al. ........... 712/35 |
| 6,470,441 B1 | 10/2002 | Pechanek et al. |
| 6,473,846 B1 | 10/2002 | Melchior ................ 711/170 |
| 6,542,989 B2 | 4/2003 | Duranton ................ 712/225 |
| 6,611,524 B2 | 8/2003 | Devanagondi et al. .... 370/395.5 |
| 6,658,578 B1 | 12/2003 | Laurenti et al. .......... 712/214 |
| 6,745,317 B1 | 6/2004 | Mirsky et al. ........... 712/11 |
| 6,760,821 B2 | 7/2004 | Stefan et al. ............ 711/154 |
| 6,769,056 B2 | 7/2004 | Barry et al. |
| 6,772,268 B1 | 8/2004 | Kristiansen et al. ....... 710/308 |
| 6,848,041 B2 | 1/2005 | Pechanek et al. ........ 712/20 |
| 6,901,476 B2 | 5/2005 | Stark et al. ............. 711/108 |
| 6,938,183 B2 | 8/2005 | Bickel et al. ............ 714/12 |
| 7,013,302 B2 | 3/2006 | Modelski et al. ......... 707/10 |
| 7,020,671 B1 | 3/2006 | Saha |
| 7,098,437 B2 | 8/2006 | Ishikawa et al. |
| 7,196,708 B2 | 3/2007 | Dorojevets et al. |
| 7,353,362 B2 | 4/2008 | Georgiou et al. |
| 7,428,628 B2 | 9/2008 | Fenney .................. 712/13 |
| 7,451,293 B2 | 11/2008 | Mitu et al. ............. 712/16 |
| 7,454,593 B2 | 11/2008 | Kirsch |
| 7,644,255 B2 | 1/2010 | Totsuka |
| 2001/0008563 A1 | 7/2001 | Yamaura et al. |
| 2002/0090128 A1 | 7/2002 | Naftali et al. ........... 382/149 |
| 2002/0107990 A1 | 8/2002 | Johnson et al. .......... 709/250 |
| 2002/0114394 A1 | 8/2002 | Ma ...................... 375/240.16 |
| 2002/0133688 A1 | 9/2002 | Lee et al. ............... 712/22 |
| 2002/0174318 A1 | 11/2002 | Stuttard et al. .......... 712/13 |
| 2003/0041163 A1 | 2/2003 | Rhoades et al. .......... 709/323 |
| 2003/0044074 A1 | 3/2003 | Weiss et al. ............. 382/246 |
| 2003/0085902 A1 | 5/2003 | Vogelaar et al. ......... 345/505 |
| 2003/0206466 A1 | 11/2003 | Aikawa ................. 365/49 |
| 2003/0208657 A1 | 11/2003 | Stark et al. ............. 711/108 |
| 2004/0006584 A1 | 1/2004 | Vandeweerd et al. ...... 718/102 |
| 2004/0030872 A1 | 2/2004 | Schlansker ............... 712/234 |
| 2004/0057620 A1 | 3/2004 | El Akel et al. ........... 382/201 |
| 2004/0071215 A1 | 4/2004 | Bellers ................. 375/240.16 |
| 2004/0081238 A1 | 4/2004 | Parhy |
| 2004/0081239 A1 | 4/2004 | Patti et al. ............. 375/240.03 |
| 2004/0170201 A1 | 9/2004 | Kubo et al. ............. 370/535 |
| 2004/0190632 A1 | 9/2004 | Cismas .................. 375/240.01 |
| 2004/0215927 A1 | 10/2004 | Beaumont ............... 712/13 |
| 2004/0223656 A1 | 11/2004 | Moreira ................. 382/240 |
| 2005/0163220 A1 | 7/2005 | Takakura et al. ......... 375/240.16 |
| 2006/0002474 A1 | 1/2006 | Au et al. |
| 2006/0018562 A1 | 1/2006 | Ruggiero ................ 382/300 |
| 2006/0072674 A1 | 4/2006 | Saha et al. ............. 375/240.25 |
| 2006/0098229 A1 | 5/2006 | Matsunaga et al. ........ 382/173 |
| 2006/0174236 A1 | 8/2006 | Stein et al. ............ 712/220 |
| 2006/0222078 A1 | 10/2006 | Raveendran ............ 375/240.16 |
| 2006/0227883 A1 | 10/2006 | Citro .................... 375/240.29 |
| 2006/0262985 A1 | 11/2006 | Chen et al. ............. 375/240.08 |
| 2007/0071404 A1 | 3/2007 | Curtner et al. ............ 386/95 |
| 2007/0162722 A1 | 7/2007 | Bivolarski et al. .......... 712/10 |
| 2007/0188505 A1 | 8/2007 | Bivolarski et al. .......... 712/10 |
| 2007/0189618 A1 | 8/2007 | Bivolarski et al. .......... 382/232 |
| 2008/0059671 A1 | 3/2008 | Bivolarski |
| 2008/0059762 A1 | 3/2008 | Mitu et al. |
| 2008/0059763 A1 | 3/2008 | Bivolarski |
| 2008/0059764 A1 | 3/2008 | Stefan |
| 2008/0126278 A1 | 5/2008 | Bronstein et al. |
| 2010/0066748 A1 | 3/2010 | Bivolarski |

FOREIGN PATENT DOCUMENTS

| | | |
|---|---|---|
| GB | 2230119 A | 10/1990 |
| JP | 04-291659 | 10/1992 |
| JP | 06-068053 | 3/1994 |
| JP | 07-192477 | 7/1995 |
| JP | 10-050076 | 2/1998 |
| JP | 11-345218 | 12/1999 |
| JP | 2001-045523 | 2/2001 |
| JP | 2001045523 | 2/2001 |
| JP | 2001-229138 | 8/2001 |
| JP | 2001229138 | 8/2001 |
| TW | 395045 | 6/2000 |
| WO | WO 01/33352 A1 | 5/2001 |
| WO | WO 01/53933 | 7/2001 |
| WO | WO 01/53933 A2 | 7/2001 |
| WO | WO 2007/050444 A2 | 5/2007 |
| WO | WO2007/082043 A2 | 7/2007 |
| WO | WO 2007/082044 A2 | 7/2007 |
| WO | WO 2007082042 A2 | 7/2007 |

OTHER PUBLICATIONS

Notice of Allowance for U.S. Appl. No. 11/584,480, mailed Sep. 8, 2008, 5 pages.

Office Action for U.S. Appl. No. 11/652,588, mailed Oct. 9, 2008, 9 pages.

Office Action for U.S. Appl. No. 11/652,584, mailed Jan. 14, 2009, 7 pages.

Young, Lee W., Authorized Officer, International Search Report and Written Opinion mailed Feb. 13, 2008 for Application No. PCT/US07/00771, 8 pages.

Young, Lee, W., Authorized Officer, International Search Report and Written Opinion mailed Mar. 26, 2008 for Application No. PCT/US06/40975, 11 pages.

Young, Lee W., Authorized Officer, International Search Report and Written Opinion mailed Feb. 19, 2008 for Application No. PCT/US07/00772, 9 pages.

Young, Lee W., Authorized Officer, International Search Report and Written Opinion mailed Feb. 19, 2008 for Application No. PCT/US07/00773, 7 pages.

Wittmann-Regis, Agnes, Authorized Officer, International Preliminary Report on Patentability mailed Apr. 2, 2009 for Application No. PCT/US06/040975, 8 pages.

Baharlou Simin, Authorized Officer, International Preliminary Report on Patentability mailed Jul. 24, 2008 for Application No. PCT/US2007/000771, 6 pages.

Baharlou Simin, Authorized Officer, International Preliminary Report on Patentability mailed Jul. 24, 2008 for Application No. PCT/US2007/000772, 7 pages.

Baharlou, Simin, Authorized Officer, International Preliminary Report on Patentability mailed Jul. 24, 2008 for Application No. PCT/US2007/000773, 5 pages.

Shaw, D.E. et al.: "Active Memory Chips: A Brief Survey and Case Study,"Circuits, Systems and Signal Processing, Cambridge, MS, US, vol. 6, No. 2 pp. 239-259, XP000747239, ISSN: 0278-081X, 1987.

Intel, Intel Architecture Software Developer's Manual—vol. 1: Basic Architecture, Chpt. 4, "Procedure Calls, Interrupts, and Exceptions,"Chpt. 5, "Data Types and Addressing Modes,"Chpt. 8, "Programming with the Intel MMX Technology," 50 pages, XP-002363616, 1999.Intel: "Intel Architecture Software Developer's Manual," vol. 1: Basic Architecture. chapeters 4,5,8, Online 1999 Intel XP002363616, Retrieved from the Internet : URL: ftp://download.intel.com/design/PentiumII/manuals/24319002.PDF>, retrieved on Jan. 20, 2006.

Mitu et al., "A CMOS Implementation of a Connex Memory," pp. 579-582, IEEE, 1997.

Stefan, Denisa and Stefan, Gheorghe, "Bi-thread Microcontroller as Digital Signal Processor," pp. 585-588, 1997 IEEE.

Hascsi, Zoltan; Mitu, Bogdan; Petre, Mariana; Stefan, Gheorghe, "High-Level Synthesis of an Enhanced Connex Memory", p. 163-166, 1996 IEEE.

Stefan, G. and Dragnici, F., "Memory Management Unit With a Performant LRU Circuit" Polytechnic Institute of Bucharesi, pp. 89-96, Jan. 1991.

Thiebaut, Dominique and Stefan, Gheorge, "Local Alignments of DNA Sequences with the Connex Engine,"pp. 1-11, Sep. 2001.

Stefan, Gheorghe and Malita, Mihaela, "The Splicing Mechanism and the Connex Memory" Technical Univ. of Bucharest, Dept. of Electronics: Univ. Of Bucharest, Fac. of Mathematics, pp. 225-229, 1997.

Hascsi, Zoltan and Stefan, Gheorghe, The Connex Content Addressable Memory (C2RAM)* "Politehnica" University of Bucharest, Electronics & Telecommunication Dpdt., pp. 422-425, 1996 IEEE.

Stefan, Gheorge, Silicon or Molecules? What's the Best for Splicing?, Technical Univ. of Bucharest, Department of Electronics, pp. 1-23, 1998.

Stefan, Gheorge, The Connex Memory. a Physical Support for Tree/List Processing, Tech. Univ. of Bucharest, Dept. of Electronics, pp. 1-22, 1994.

Stefan, Gheorge and Benea, Robert, Connex Memories & Rewriting Systems, Politehnica Univ. of Bucharest, Department of Electronics, pp. 1299-1303, 1998.

Berrached, Ali et al., "A Decoupled Access/Execute Architecture for Efficient Access of Structured Data," PA State University, 1993 IEEE.

Yamashita, Nobuyuki et al., "A 3.84 GIPS Integrated Memory Array Processor with 64 Processing Elements and a 2-Mb SRAM," pp. 1336-1343, 1994 IEEE.

Stefan, Gheorghe, and Thiebaut, Dominique, "The Connex Engine*: An In-memory Device for Fast String Operations,"Politehnica Univ. of Bucharest, Department of Electronics, pp. 1-26, Jan. 11, 2002.

Intel, Intel Architecture Software Developer's Manual—vol. 1: Basic Architecture, Chpt. 4, "Procedure Calls, Interrupts, and Exceptions".

Mitu et al., "A CMOS Implementation of a Connex Memory," pp. 570-582, IEEE, 1997.

Stefan, Denisa and Stefan, Gheorghe, "Bi-thread Microcontroller as Digital Signal Processor" 1997 IEEE.

Hascsi, Zoltan; Mitu, Bogdan; Petre, Mariana; Stefan, Gheorghe, "High-Level Synthesis of an Enhanced Connex Memory", 1996 IEEE, p. 163-166.

Stefan, G. and Dragnici, F., "Memory Management Unit With a Performant LRU Circuit" Polytechnic Institute of Bucharesi, pp. 89-96.

Thiebaut, Dominique and Stefan, Gheorge, "Local Alignments of DNA Sequences with the Connex Engine".

Stefan, Gheorghe and Malita, Mihaela, "The Splicing Mechanism and the Connex Memory" Technical Univ. of Bucharest, Dept. of Bucharest, Fac. Of Mathematics, pp. 225-229.

Hascsi, Zoltan and Stefan, Gheorghe, The Connex Addressable Memory (C2RAM)* "Politehnica" University of Bucharest, Electronics & Telecommunication Dpdt., pp. 422-425.

Stefan, Gheorge, Silicon or Molecules? What's the Best for Splicing?, Technical Univ. of Bucharest, Department of Electronics.

Stefan, Gheorge, The Connex Memory. A Physical Support for Tree/List Processing, Technical Univ. of Bucharest, Department of Electronics.

Stefan, Gheorge and Benea, Robert, Connex Memories & Rewriting Systems, Politehnica Univ. of Bucharest, Department of Electronics.

Berrached, Ali et al., A Decoupled Access/Execute Architecture for Efficient Access of Structured Data, PA State University, 1993 IEEE.

Nyasulu, Peter M., et al., "Minimizing the Effect of the Host Bus on the Performance of a Computational RAM, Logic-in-Memory Parallel-Processing System,"pp. 631-634, May 1999, IEEE.

Le, T.M., et al., "Computational*RAM Implementation of MPEG-2 for Real-time Encoding," Department of Electronics, Carleton University, pp. 182-193, Dec. 2, 1997, SPIE vol. 3021.

Wallace, Steven, et al., "Threaded Multiple Path Execution," 12 pp., ISCA, Jun. 1998, IEEE Xplore, downloaded Feb. 23, 2009.

Oehring, Heiko, et al., "MPEG-2 Video Decompression on Simultaneous Multithreaded Multimedia Processors," 6 pp., IEEE Xplore, Oct. 1999.

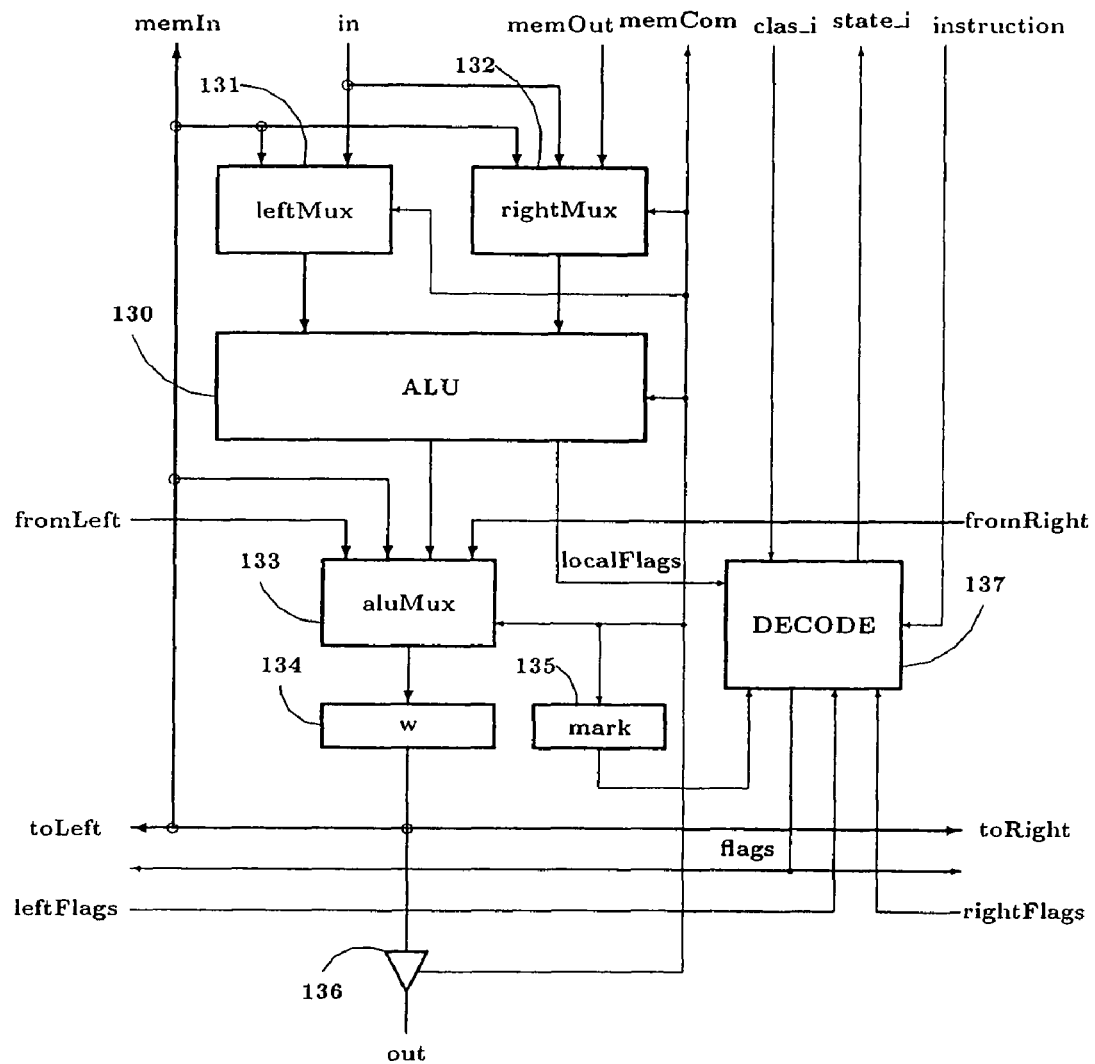
Figure 4: The structure of a cell.

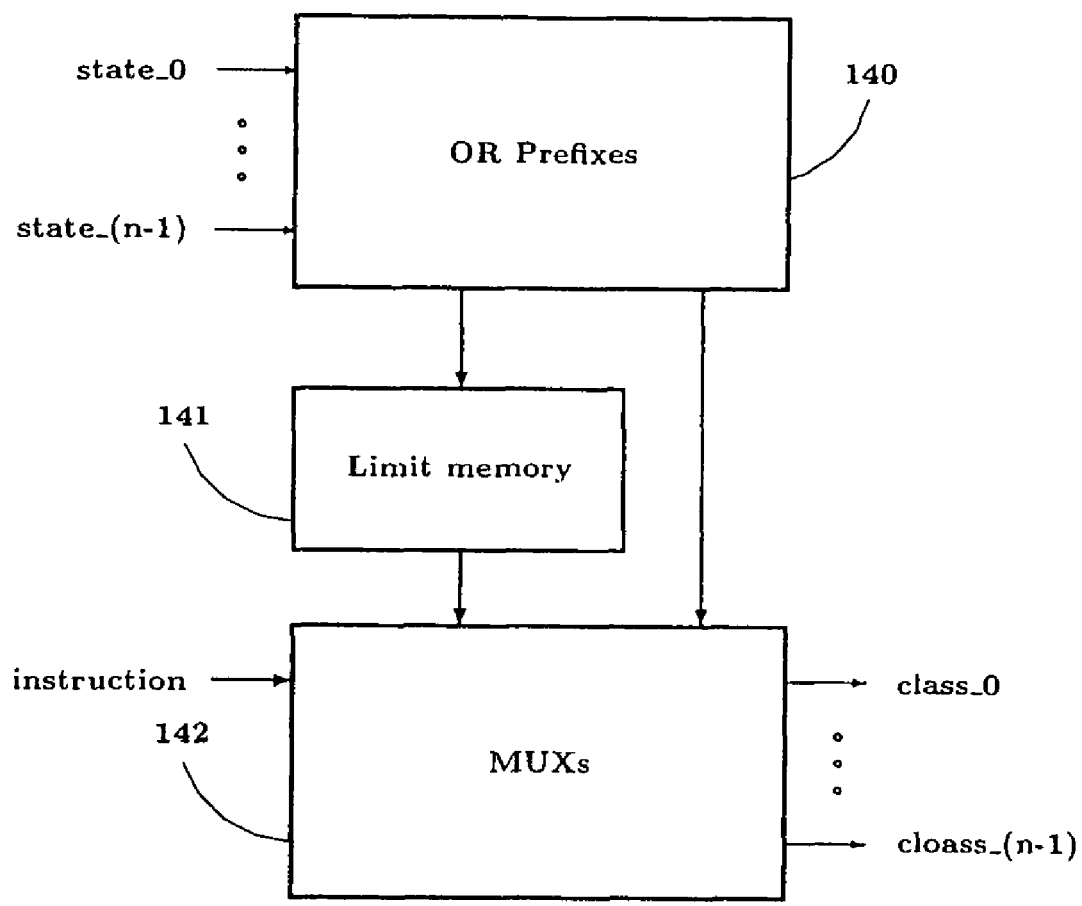
Figure 5: The structure of the transcoder.

CELLULAR ENGINE FOR A DATA PROCESSING SYSTEM

CROSS REFERENCE TO RELATED APPLICATIONS

This application is a Divisional Application of the application Ser. No. 10/727,811, filed Dec. 4, 2003 now U.S. Pat. No. 7,383,421 and entitled "CELLULAR ENGINE FOR DATA PROCESSING SYSTEM", hereby incorporated by reference in its entirety, and which claims priority to U.S. Provisional Application Ser. No. 60/431,154 entitled "ENHANCED VERSION OF CONNEX MEMORY", filed on Dec. 5, 2002, hereby incorporated by reference in its entirety. The subject matter of this application relates to U.S. Pat. No. 6,760,821 entitled "A MEMORY ENGINE FOR THE INSPECTION AND MANIPULATION OF DATA" issued on Jul. 6, 2004, and U.S. Pat. No. 7,107,478 entitled "DATA PROCESSING SYSTEM FOR A CARTESIAN CONTROLLER" issued on Sep. 12, 2006, both of which are herein incorporated by reference in their entirety.

FIELD OF THE INVENTION

The invention relates generally to an engine for a data processing system, and more particularly, to a cellular engine for a data processing system that implements an active associative memory device, or associative engine, to increases data processing speeds and efficiency.

BACKGROUND OF THE INVENTION

Automated or semi-automated data processing systems are integral components in a wide variety of applications. Typically, data management systems are embedded within a larger computerized apparatus or system and serve to assist or facilitate those applications running in the larger computerized system, such as by performing necessary arithmetic operands, data conversion or the like.

As is known, basic data processing systems may be categorized as single instruction, single data stream (SISD) devices and typically utilize, in their simplest expression, a processor, an interface and a memory device. The processor performs directed tasks in response to instructions inputted either by a user, or by another component of an overall system. In performing its designated tasks, the processor relies upon the interface to communicate commands, such as data requests, to the memory device, as well as to receive thereby specified data stored within the memory device.

Known data processing systems most often utilize conventionally addressed memory devices. That is, known data systems utilize memory devices which include defined locales therein, each locale having its own particularized address. In this manner, should the processor desire to add the value stored at address A with the value stored at address B, the memory device will proceed to the specific, addressed locations, or cells, within the memory device, and communicate these values, via the interface, to the processor where the appropriate summation can occur. In such systems, the nature and capability of the integral components, that is, the nature and capabilities of the processor and the memory devices, are well defined and distinct from one another. FIG. 1 depicts such a known data processing system wherein processor 2 operates in response to tasks inputted via input line 4. An interface 6 is thereafter utilized to communicate instructions, such as data requests, to the memory device 8, as well as to receive thereby specified data stored within the memory device 8.

It is also known that data processing systems may include more than one processor and memory device, and further, that these multiple components may be part of a system that executes multiple streams of instructions. These multiple instruction streams, multiple data streams (MIMD) devices can be viewed as large collections of tightly coupled SISD devices where each processor in the system, although operating in overall concert with the other integrated processors, is responsible for a specific portion of a greater task. That is, the effectiveness of MIMD devices is typically limited to those specified arenas where the problem to be solved lends itself to being parsable into a plurality of similar and relatively independent sub-problems. The nature and capabilities of those integral components of MIMD devices are also well defined and distinct from one another.

Another known data processing system involves single instruction, multiple data streams (SIMD) devices. These SIMD devices utilize an arbitrary number of processors which all execute, in sync with one another, the same program, but with each processor applying the operator specified by the current instruction to different operands and thereby producing its own result. The processors in a SIMD device access integrated memory devices to get operands and to store results. Once again, the nature and capabilities of those integral components of a SIMD device are well defined and distinct from one another in that computations are executed by the processors that must have some type of access to a memory device to do their job.

While known data processing systems are therefore capable of processing large amounts of data, the defined and unchanging nature of the processors and memory devices limits the speed and efficiency at which various operations may be completed.

Various architectures have also been constructed which utilize another class of memory devices which are not conventionally addressed. These memory devices are typically described as being 'associative' memory devices and, as indicated, do not catalog their respective bits of data by their location within the memory device. Rather, associative memory devices 'address' their data bits by the nature, or intrinsic quality, of the information stored therein. That is, data within associative memory devices are not identified by the name of their locations, but from the properties of the data stored in each particular cell of the memory device.

A key field of fixed size is attached to all data stored in most associative memory devices. A search key may then be utilized to select a specific data field, or plurality of data fields whose attached key field(s) match the search key, from within the associative memory device, irrespective of their named location, for subsequent processing in accordance with directed instructions.

While the implementation of associative memory devices is therefore known, these devices have always been utilized as specialized blocks, or components, within known data processing systems employing standard processors, interfaces and conventionally addressed memory devices. That is, although known associative memory devices do not employ conventional addressing protocols, they are incapable of processing the information themselves, relying instead upon known processors and external memory devices in a manner consistent with known SISD, SIMD and MIMD architectures.

With the forgoing problems and concerns in mind, the present invention therefore seeks to provide an engine for a data processing system that overcomes the above-described drawbacks by utilizing an active associative memory device using variable-size keys whose cells, by selectively acting as both a processor and a memory device, never have to access a separate memory block to do their jobs, thus substantially reducing processing, computational and communication times.

SUMMARY OF THE INVENTION

It is an object of the present invention to provide an efficient data processing system.

It is another important aspect of the present invention to provide a cellular engine for a data processing system that implements an active associative memory, or associative engine device, in a manner which increases data processing speeds and efficiency.

It is another important aspect of the present invention to provide a cellular engine for a data processing system that implements an active associative memory, or associative engine device whose cells, by selectively acting as both a processor and a memory device, never have to access a separate memory block to do their jobs.

It is another important aspect of the present invention to provide a cellular engine for a data processing system that implements an active associative memory device, or associative engine, whose individual cells can selectively process a given instruction based upon their respective state as set by a globally propagated instruction or query.

It is another important aspect of the present invention to provide a cellular engine for a data processing system that implements an active associative memory device, or associative engine, whose individual cells can selectively process, in parallel, a given instruction based upon their respective state, all within a single clock cycle.

It is another important aspect of the present invention to provide a cellular engine for a data processing system that implements an active memory device, or cellular engine, that allows the use of variable-length key fields.

It is another important aspect of the present invention to provide a cellular engine for a data processing system that implements an active memory device, or cellular engine, whose structure is homogeneous, thus allowing the very same piece of information stored in memory to be (part of) either the key field or data field at different times during the execution of a program.

It is another object of the present invention to provide a cellular engine for an efficient data processing system that enables the dynamic limitation of the search space within an active associative memory device.

It is another object of the present invention to provide a cellular engine for an efficient data processing system that provides for the selective accessibility of either end of the cell array.

It is another object of the present invention to provide an engine for an efficient data processing system which is capable of regulating data transmission between two or more cells within an associative memory device.

According to one embodiment of the present invention, a data processing system includes an associative memory device containing n-cells, each of the n-cells includes a processing circuit. A controller is utilized for issuing one of a plurality of instructions to the associative memory device, while a clock device is utilized for outputting a synchronizing clock signal comprised of a predetermined number of clock cycles per second. The clock device outputs the synchronizing clock signal to the associative memory device and the controller globally communicates one of the plurality of instructions to all of the n-cells simultaneously, within one of the clock cycles.

These and other objectives of the present invention, and their preferred embodiments, shall become clear by consideration of the specification, claims and drawings taken as a whole.

BRIEF DESCRIPTION OF THE DRAWINGS

FIG. 4 is a block diagram showing the structure of a cell, or processing element, according to one embodiment of the present invention.

FIG. 5 is a block diagram showing the structure of the transcoder.

DETAILED DESCRIPTION OF THE PREFERRED EMBODIMENT

Figure 1:
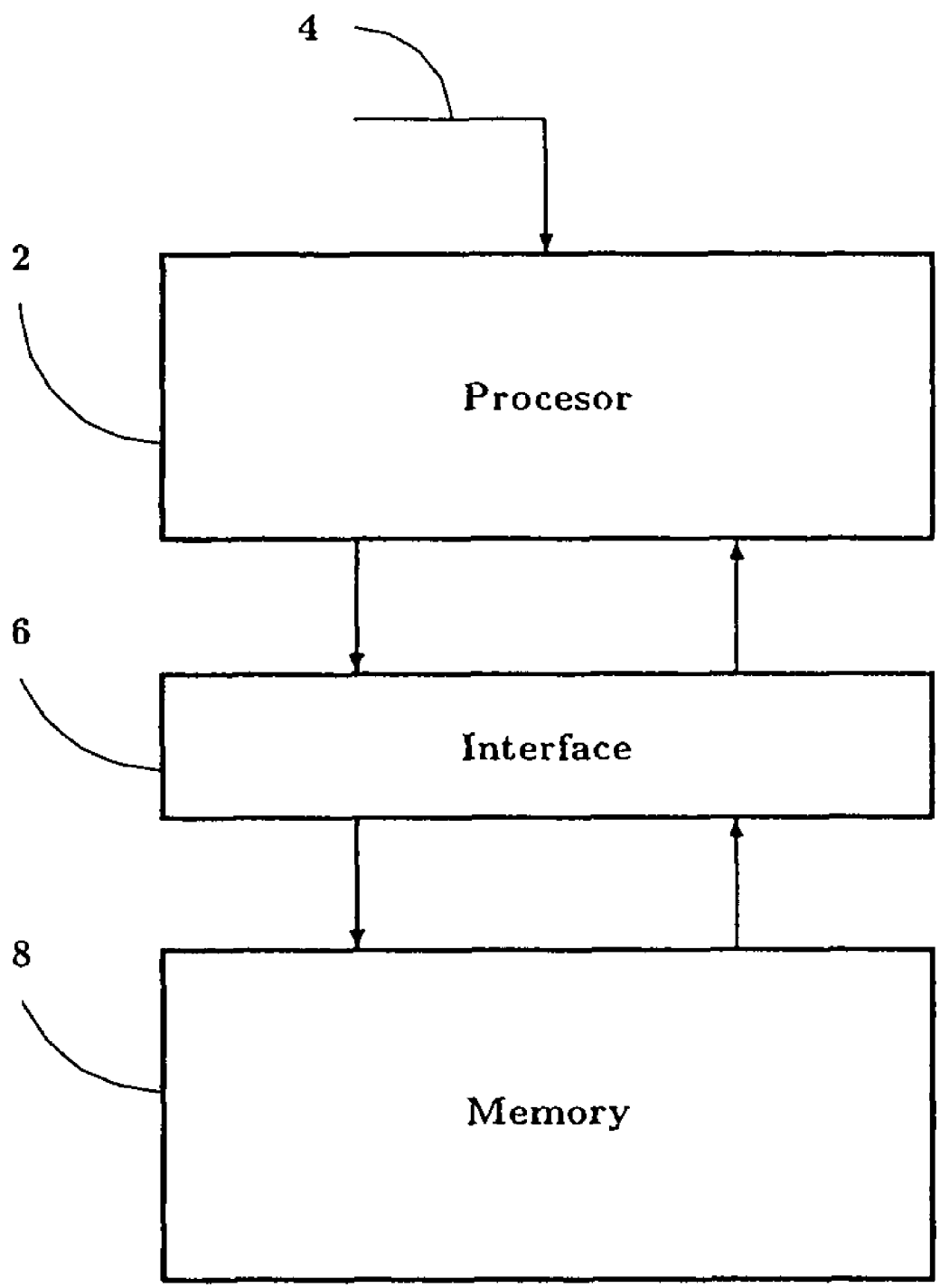
FIG. 1 is a block diagram illustrating a known SISD data processing architecture.
Figure 2:
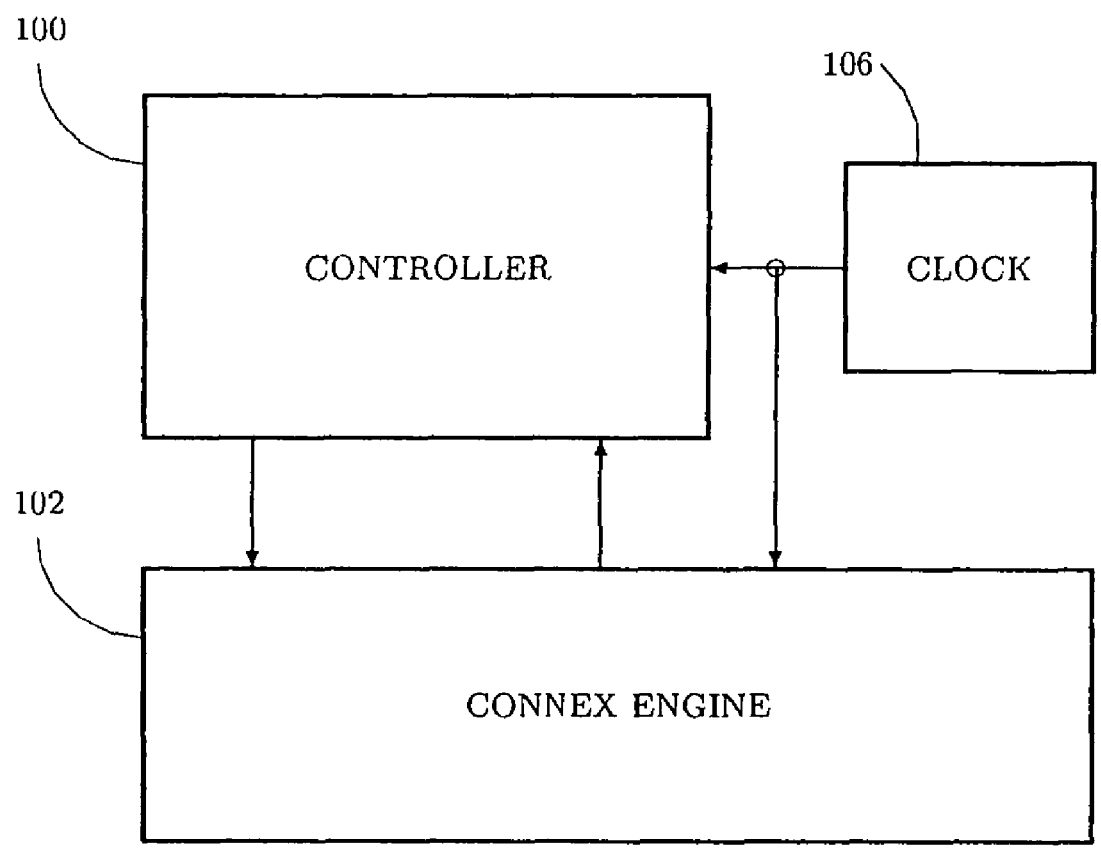
FIG. 2 is a block diagram showing the general configuration of a data processing system, including a memory engine and a synchronizing clock element, according to one embodiment of the present invention.

FIG. 2 depicts the architectural relationship between a controller 100, hereinafter referred to as the Cartesian Controller (CC), and a cellular engine 102, hereinafter referred to as the Connex Engine (CE). A synchronizing clock circuit 106 is utilized to coordinate the operation of the CC 100 and the CE 102 such that one of a plurality of instructions may be issued by the CC 100 and transferred to the CE 102 for parallel execution and processing.

The clock circuit 106 is capable of outputting a predetermined number of clock cycles per second, and the CC 100 is capable of performing an internal operation such that the CC 100 may perform one of a plurality of internal operations while also issuing in parallel one of a plurality of instructions to the CE 102 within a single clock cycle.

Figure 3:
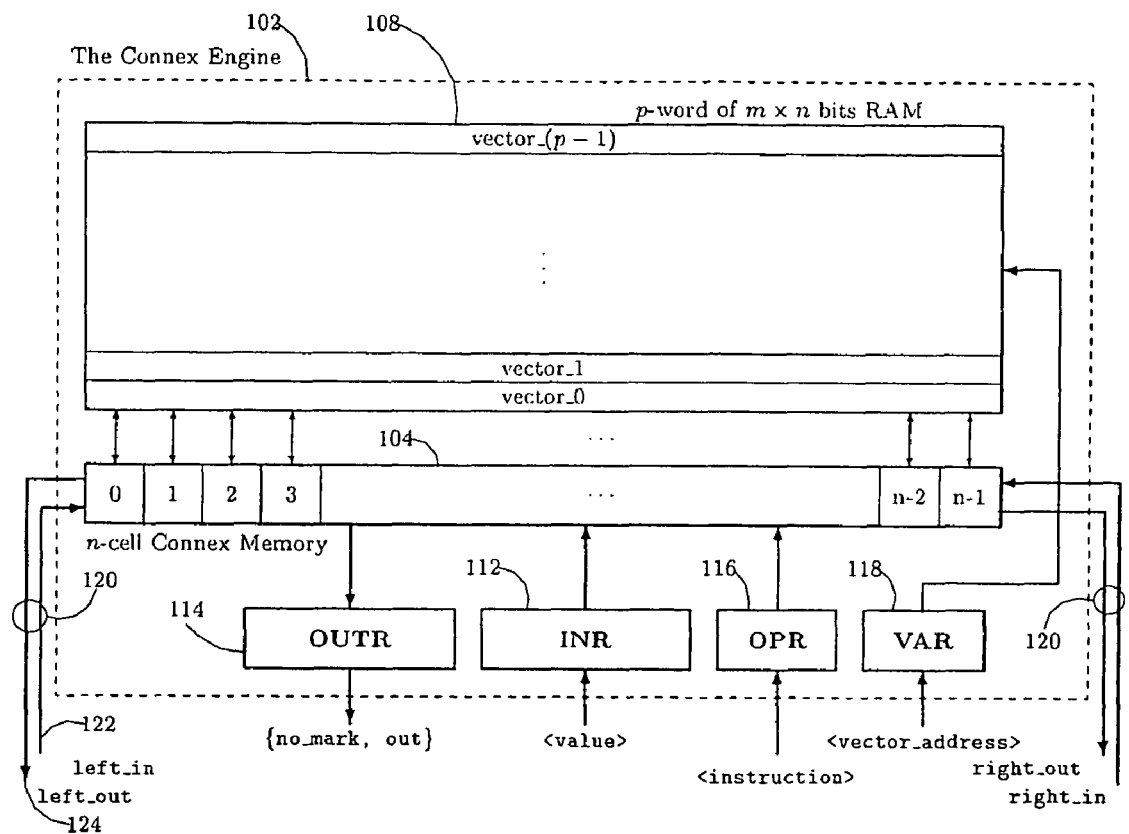
FIG. 3 is a block diagram showing a more detailed view of the memory engine shown in FIG. 2.

As depicted in FIG. 3, the CE 102 is made up of an array of active cells, or processing elements, embodied as the Connex Memory (CM) 104 and a RAM (random access memory) containing a plurality of vectors 108, each vector having the same storage capacity as the CM 104 and thus being capable of selectively storing the entire contents of the CM 104. That is, the CE 102 includes the CM 104 having n-cells and the associated vector memory 108, which is under the control of the sequential CC 100. In one embodiment of the present invention, the purpose of the memory vectors 108, is to allow for search, insert and delete operations to be performed on character strings longer than may be accommodated within the CM 104, and to offer a lower cost of implementation and reduced power dissipation, as will be discussed in more detail later.

It will be readily appreciated that the present invention contemplates that the CE 102 may have any number of circuit-specific configurations without departing from the broader aspects of the present invention provided that the CC 100 is capable of issuing commands to, and receiving data from, the CE 102.

Referencing FIG. 3, each n-bit cell in the CM 104 contains the following registers:

'mark'—a one-bit marker register;

'w'—the main register, which plays a role similar to that of an accumulator in a more conventional design, while also being associated with a number of general registers equal to the number of memory vectors.

Notations: Let x be a bit field of length m and y be a bit field of length n: {x, y} denotes a bit field of length m+n formed by appending y to x. The notation can be generalized to any number of bit fields, e.g. for three arguments: {a, b, c}={a, {b, c}}={{a, b}, c}.

Let r be an (n+1)-bit register and $n \geq k \geq 0$: r[k] denotes the (k+1)-th bit in r, counting from the right end (k=0) to the left end (k=n).

Let r be an (n+1) bit register and $n \geq m \geq k \geq 0$: r[m:k] denotes a bit field of length m−k+1, {r[m], r[m−1], ..., r[k]}.

Therefore, the contents of an m-bit cell within the CM 104 are the contents of its w register appended to the contents of its mark register:

cell [m−1:0]={mark, value}
value [m−2:0]={ext, symbol}
symbol [m−3:0]

where ext stands for the extension bit, used to create an alphabet of special values (for ext=1).

An important aspect of the present invention resides in the ability of each m-bit cell within the CM 104 to actively process data in addition to storing data. The processing of data may occur either within each m-bit cell, or by affecting the cell immediately to the left or right of a predetermined cell. It should be noted that by enhancing the functionality of each m-bit cell within the CM 104 in this manner, the present invention exhibits a system-level behavior that is more complex and, as such, exceeds the performance of other data processing systems.

It is another important aspect of the present invention that the ability to actively process data at the cell level within the CM 104 is accomplished, in part, by the ability of each cell to be 'marked', which is part of the condition, or predicate, designating it as a cell which will subsequently perform a task, or execute an operand, on itself, or an adjacent cell within the CM 104.

Returning to FIG. 3, for the purposes of the present invention, a cell is considered 'marked' if the one-bit, internal cell register mark=1 and is considered 'not marked' if mark=0. Moreover, the CM 104 has a 'left limit' and a 'right limit' that can be dynamically adjusted by issuing specialized instructions. In addition, the 'search space' of the CM 104 is that segment of the CM 104 which is delimited by the left limit and the right limit. It will be readily appreciated that the internal cell register mark may be greater than one bit in length without departing from the broader aspects of the present invention.

As mentioned previously, the execution of code supplied to the CE 102 is driven by the CC 100. The CE 102/CC 100 interface makes use of four special registers, as shown in FIG. 3:

'INR' 112—data input register—all CE 102 instructions get their (immediate) data argument (if any) from INR (supplied by CC 100);

'OUTR' 114—data output—contains the 'no mark' bit and a value. If at least one of the cells is marked, OUTR contains 0 followed by the value contained in the first marked cell; otherwise OUTR contains 1 followed by an implementation-dependent special value, such as 11...1;

'OPR' 116—instruction register, contains the operation code for the current CE 102 instruction (the source is a dedicated field in the CC 100 instruction);

'VAR' 118—address register for the vector memory. The VAR 118 register is updated by special CC 100 instructions and is used as an argument to instructions that explicitly manipulate vectors; The VAR 118 register is also used in the execution of all operations involving the general registers associated with cells.

As further represented in FIG. 3, input/output lines 120 may be selectively utilized to access both ends of the CM 104. As utilized herein, the input/output lines 120 have the following meaning:

'left_in' 122={w, mark, eq, first}, by default all are 0 (eq=1 means that the two operands in the cell are equal; first=1 means the cell is the first marked cell);
'left_out' 124={w, mark, eq, first}, come from the first cell;
'right_in' 126={w, mark, eq, first}, by default all are 0;
'right_out' 128={w, mark, eq, first}, come from the last cell.

FIG. 4 illustrates one embodiment of an internal structure of the m-bit cells within the CM 104. As shown in FIG. 4, the internal structure of each cell includes the following circuits:

ALU: arithmetic and logic unit 130 that performs addition, subtraction, comparisons, and bitwise logic functions
rightMux: multiplexer 132 which selects the right operand for ALU from:
  w: the value stored in the accumulator register 134
  in: the value received from the input register 112
  memOut: the value read from the vector memory addressed by the vector address register, VAR 118
leftMux: multiplexer 131 which selects the left operand for ALU from:
  w: the value stored in the accumulator register 134
  in: the value received from the input register 112
aluMux: multiplexer 133, which selects the value to be loaded into the accumulator register (w 134) from:
  w: the value stored in the accumulator register 134
  fromLeft: the value stored in the accumulator register of the left cell
  fromRight: the value stored in the accumulator of the right cell
  the output of ALU 130
w: the accumulator register 134
mark: the marker register
tristate output buffers
DECODE: a combinational circuit 137 which decodes the instructions according to the local context generated by:
  localFlags: generated by ALU
  leftFlags: the flags received from the left cell
  rightFlags: the flags received from the right cell
  class_i: classification code received from the TRANSCODER generating:
    command codes for leftMux, rightMux, ALU, aluMux, mark, tristate buffers
    flags from neighboring cells
    state_i bit of the cell for the TRANSCODER The Transcoder FIG. 5 illustrates the organization of the TRANSCODER, a circuit integrated with the CE 102 and acting as part of a control interconnection network. That is, the TRANSCODER is utilized, in part, to classify each cell according to:
  its state bit (state_i), (i.e. the local state)
  the state bits of all cells, (i.e. the global state)
  the current instruction to be performed, into the following categories:
  marked cell
  first marked cell
  last marked cell
  cell within limits (the limits are stored in a memory area of the TRANSCODER)
  active cell.

It will be readily appreciated that other cell categories could be added to the above without departing from the broader aspects of the present invention.

The TRANSCODER receives from each cell a state bit (state_0, state_1, . . . , state_(n−1)) and sends back to each cell a 3-bit code specifying the class(es) to which it belongs (class_0, class_1, . . . , class_(n−1)).

The building blocks of the transcoder are:
OR Prefixes: a circuit 140 calculating mainly the relative positions of cells according to the classification to be performed
Limit memory: two latches 141 used to store information about the limits MUXs: multiplexers 142 which, based on the current instruction, select the class of each cell The TRANSCODER can be implemented in two different ways in order to optimize its size and speed:
a linear version for small values of n
a bi-dimensional version (for large values of n), containing a LINE TRANSCODER and a COLUMN TRANSCODER, each having a size of the order $O(n^{1/2})$.

Another important aspect of the present invention, therefore, is the ability of the CC 100 to issue instructions to the CE 102 and cause such instructions to be broadcast, in parallel and in a single clock cycle, to all cells within the CM 104. Those cells meeting the criteria set out in the instructions from the CC 100 may, for example, independently and selectively mark themselves, simultaneously in the same clock cycle, whereby subsequent instructions or operations, in the following clock cycle, may be effectuated according to the resulting classification, again in parallel and in a single clock cycle.

It is therefore another important aspect of the present invention that the TRANSCODER not only classifies each cell in accordance with its local state, for example, its marked or non-marked state, but also in accordance to its global state and the current instruction. That is, while one aspect of a cell's classification by the TRANSCODER may be that a particular cell's local state is 'marked', it is also important for such a cell to 'know' its 'global state' with respect to all other cells, such as whether the 'marked' cell is the 'first marked' cell or the 'last marked' cell.

By way of an example, suppose certain cells within the CM 104 have been marked, via some property of these cells as indicated by an instruction from the CC 100 in the previous clock cycle, as follows: (marked cells being represented by bolded numbers in the string):

CM: 2 5 2 7 6 4 1 0 . . .

Suppose next that the instruction "addr 5" is broadcast to all cells within the CM 104, again in parallel and in a single clock cycle, where vector 5 in the vector memory 108 is as follows:

Line 5: 3 4 7 8 2 5 12 . . .

All marked cells within the CM 104 will then add the contents of their data field to the contents of the corresponding element in vector 5, with the result of this operation being stored in the respective cells of the CM 104, as follows:

CM: 5 9 2 7 6 9 1 0 . . .

As indicated by the example above, the marked/non-marked state of each cell within the CM 104 is not affected by the particular instruction issued by the CC 100 (in this example; although as noted, certain instructions will affect the marked state of each cell within the CM 104). Moreover, all addition operations are executed simultaneously (that is, in parallel with one another) and internal to each marked cell within a single clock cycle.

As further indicated by the example above, the data processing system of the present invention can implement, at the system level, operations defined on vectors of values; in this example the vector values are the CM 104 data and vector 5 of the vector memory 108. In this regard, the data processing system of the present invention includes a CE having a CM 104 with a linear array of active cells (i.e., processing elements) where each cell within the CM 104 has one or more marker bits and one accumulator (134); at same time, at the level of each cell, the corresponding elements of all vectors can be seen as a set of associated registers. (the number of associated registers is therefore equal to the number of vectors 108).

Moreover, it is another important aspect of the present invention that by concatenating the accumulators and individual associated registers of each cell within the CM 104 respectively, the data processing system of the present invention provides for operations on vectors of values, thereby enabling matrix computations and the like.

As contrasted to SIMD and MIMD systems, discussed in the Background of the present invention, the data processing system of the present invention does not rely upon an unchanging and strict delineation between the operations of a processor and a linked memory device.

In the data processing system of the present invention, information may be stored for retrieval in the CM 104, but conventional "memory address' is not a concept; although each cell within the CM 104 may itself selectively process information in response to globally issued commands, it is not a processor per se, although each cell within the CM 104 does contain a processing circuit, as discussed previously; and the performance of the data processing system of the present invention is strictly a linear function of its size and applicable across a wide range of programs/applications in a manner that is not exhibited by other known programmable machines.

It will be readily appreciated that the data processing system of the present invention is not limited in the nature and configuration of the processing circuit contained within each of the n-cells in the CM 104.

In accordance with the present invention, the CE 102 has a rich set of instructions, grouped in the following classes:
global management—setting and resetting the CM 104 limits; exchanging data between the CM 104 and RAM vectors 108;
search/access—associative access to one or more of the cells of the CM 104;
marker manipulation;
data store and transfer;
arithmetic and logic;
conditional; and
index.

Note that all instructions for the CE 102 are executed in a single machine cycle.

The CE 102 does not itself have access to a program memory to fetch its instructions—every cycle its cells expect to get an operation code in a special register, but it takes a different entity, in the present case, the CC 100, to do it for them; the code is sequential and there needs to be a single point of access to fetch it. The main job of the CC 100 is therefore to drive the execution of the programs of the CE 102, i.e., fetch instructions to be executed by individual cells and place them in an internal register; at the same time, it serves as a gateway to CE 102 and thereby takes care of all input/output interactions. The CC 100 also executes simple sequential operations without which it would be impossible to write meaningful code for such a machine: one class of such operations are the so-called "control primitives", i.e., those instructions that are used to code decision-making sequences (e.g. if, while, repeat, etc).

Pseudocode

In the following, pseudocode that uses a notation inspired from the C programming language is utilized to specify informally the semantics of most instructions of the CE 102. It will be readily appreciated that this kind of description is not intended to limit the expression of the actual implementation of instructions, and that other expressions are also contemplated by the present invention.

A special pseudo-statement, forall, describes actions executed by sets of cells in parallel; its syntax may be expressed as:

<forall statement>::=forall [(<forall condition>)]<statement>;
<forall condition>::=marked
   |in searchSpace;

Consider the following three variants of forall:

```
1.   forall
        <action>;
2.   forall (in searchSpace)
        <action>;
3.   forall (marked)
        <action>;
```

Variant 1 may be utilized to specify an action executed by all the cells in the CM 104. Variant 2 may be utilized for an action involving all the cells in the search space (see above), while variant 3 applies to cases when all marked cells execute the specified action.

At the level of each cell, the complete data set needed to execute all the instructions, together with their names used in pseudo-code, are:

the cell's registers (including associated registers), i.e. w, mark, r0, r1, . . . , rN; and the content of the cell's right and left neighbors, i.e. right_w, right_mark, and left_w, left_mark respectively.

At the same time, predicates first_mark and last_mark can be evaluated at the cell level; the former is true for the leftmost marked cell in CM, while the latter is true in the case of the rightmost marked cell.

Global Management Instructions ldl <value>: load line immediate; the contents of all CM cells (markers and w registers) are restored from the memory vector selected by the value generated to the input of VAR:
   CM=RAM[VAR];

stl <value>: store line immediate; the contents of all CM cells (markers and w registers) are saved to the memory vector selected by the value generated to the input of VAR
   RAM[VAR]=CM;

llim: left limit; sets the left limit of the search space to the first marked cell. No markers are affected. Note that the left limit is the leftmost cell affected by search/access instructions.

rlim: right limit; sets the right limit of the search space to the first marked cell. No markers are affected. Note that the right limit is the rightmost cell affected by basic search/access instructions.

droplim: remove limits; the left limit is set to the leftmost CM cell, while the right limit is set to the rightmost CM cell. No markers are affected.

Search/Access Instructions

Note: All the instructions described in this section act only within the limits of the search space; arguments are m−1 bit values available in the input register (INR).

find <value>: identifies all the cells holding values equal to the argument. For every cell where a match is found, the marker bit of its right neighbour is set to one; all the other marker bits are set to 0:

```
forall (in searchSpace)
   mark = (left_w == INR)? 1: 0;
``` match <value>: compares values stored in all marked cells to the argument. If a match is found in a given cell, the marker bit of the following cell is set to 1; all the other marker bits are set to 0:

forall (in searchSpace)
   mark=(left_mark && left_w==INR)? 1: 0;

lfind <value>: find and mark left; identifies all cells holding a value equal to the argument. For every cell where a match is found, the marker bit of its left neighbour is set to one; all the other marker bits are set to 0:

forall (in searchSpace)
   mark=(right_w==INR)? 1: 0;

lmatch <value>: match and mark left; compares values stored in all marked cells to the argument. If a match is found in a given cell, the marker bit of the preceding cell is set to 1; all the other marker bits are set to 0:

forall (in searchSpace)
   mark=(right_mark && right_w==INR)? 1: 0;

markall: marks all cells in the search space:
   forall (in searchSpace)
   mark=1;

addmark <value>: marks all the cells containing a value equal to the argument; no other markers are affected:

```
forall (in searchSpace) {
   if (w == INR)
      mark = 1;
}
``` mark <value>: marks all the cells containing a value equal to the argument; all the other marker bits are set to 0.

forall (in searchSpace)
   mark=(w==INR)? 1: 0;

clr <value>: clears the marker bit of all cells containing a value equal to the argument.

```
forall (in searchSpace) {
   if (w == INR)
      mark = 0;
}
```

Marker Manipulation Instructions clrf: clear first; clears the first (i.e. leftmost) marker.

```
forall {
   if (first_mark)
      mark = 0;
}
``` trace: duplicates markers leftward.

```
forall {
    if (right_mark)
        mark = 1;
    if (mark)
        mark = 1;
}
``` keepl: keep last; clears all markers except the last (i.e. rightmost) one.

```
forall {
    if (!last_mark)
        mark = 0;
}
``` clrl: clear last; clears the last (i.e. rightmost) marker.

```
forall {
    if (last_mark)
        mark = 0;
}
``` left: shifts all markers one cell to the left.
forall
mark=right_mark;
right: shifts all markers one cell to the right.
forall
mark=left_mark;
cright: conditional shift right; all markers are shifted one cell to the right unless their right neighbour contains a value equal to the argument, in which case 11 . . . 1 is substituted for that value.

```
forall {
    if (left_mark && w == INR) {
        mark = 0;
        w = 11...1;
    }
    if (left_mark && w != INR)
        mark = 1;
    if (mark)
        mark = 0;
}
``` cleft: conditional shift left; all markers are shifted one cell to the left unless their left neighbour contains a given value, in which case 11 . . . 1 is substituted for the value.

```
forall {
    if (right_mark && w == INR) {
        mark = 0;
        w = 11...1;
    }
    if (right_mark && w != INR)
        mark = 1 ;
    if (mark)
        mark = 0;
}
```

Data Store and Transfer Instructions
nop: no operation:
reset <value>: stores a value in all cells. No markers are affected.
forall
w=INR;
get: the value stored in the first marked cell is sent to the CM output and its marker moves one position to the right. No other markers are affected.

```
forall {
    if (first_mark) {
        OUTR = w;
        mark = 0;
    }
    if (left_mark is first_mark)
        mark = 1;
}
``` back: the value stored in the first marked cell is sent to the CM output and its marker moves one position to the left. No other markers are affected.

```
forall {
    if (first_mark) {
        OUTR = w;
        mark = 0;
    }
    if (right_mark is first_mark)
        mark = 1;
}
``` set <value>: stores a value in the first marked cell. Markers are not affected.

```
forall (marked) {
    if (first_mark)
        w = INR;
}
``` setall <value>: stores a value in all marked cells. Markers are not affected.
forall (marked)
w=INR;
ins <value>: inserts a value before the first marked cell. The contents of all cells to the right of the insertion point are shifted one position to the right. Note that the value initially held in the rightmost cell is lost in the process.

```
forall {
    if (right of first_mark)
        w = left_w;
    if (first_mark)
        w = INR;
    mark = left_mark
}
``` del: deletes the value stored in the first marked cell. The cell remains marked and the contents of all cells to the right of the deletion point are shifted one position to the left.

```
forall {
    if (first_mark)
        w = right_w;
    if (right of first_mark) {
```

```
    w = right_w;
    mark = right_mark;
    }
}
``` cpr: copy right; for all marked cells, copies the whole cell contents (w register and marker) to the right neighbour.

```
forall {
    if (left_mark)
        w = left_w;
        mark = left_mark;
}
``` cpl: copy left; for all marked cells, copies the whole cell contents (w register and marker) to the left neighbour.

```
forall {
    if (right_mark)
        w = right_w;
        mark = right_mark;
}
``` ccpr <value>: conditional copy right; for all marked cells, copies the value held in register w to the right neighbour; markers are also copied, unless a value equal to the argument is stored in w.

```
forall {
    if (left_mark && left_w != INR) {
        w = left_w;
        mark = 1;
    }
    else
        mark = 0;
}
``` ccpl <value>: conditional copy left; for all marked cells, copies the value held in register w to the left neighbour; markers are also copied, unless a value equal to the argument is stored in w.

```
forall {
    if (right_mark && right_w != INR) {
        w = right_w;
        mark = 1;
    }
    else
        mark = 0;
}
``` ld <address>: load immediate; for all marked cells, load into w the value held in register <r>, part of the RAM vector selected by the value generated to the input of VAR.
  forall (marked)
    w=<r>;

st <address>: store immediate; for all marked cells, move the value held in w to register <r>, part of the RAM vector selected by the value generated to the input of VAR.
  forall (marked)
    w=<r>;

Arithmetic & Logic Instructions

All arithmetic instructions are carried out on m−2 bit numbers represented in 2's complement: the operand <op> is one of the associated cell registers (part of the RAM vector selected by the value generated to the input of VAR), or a m−2 bit number supplied by the controller:
  <op>::=INR[m−3:0] (immediate value)|r(RAM vector element)

add <op>: add the operand to the w register of all marked cells. Markers are not affected.
  forall (marked)
    w+=<op>;
  fadd <op>: full add, with the right extension being treated as a carry (see add).

```
forall {
    if (mark)
        w += (<op> + right_w[m−2]);
    if (left_mark)
        w[m−2] = 0;
}
``` sub <op>: subtract the operand value from the value stored in the w register of all marked cells. No markers are affected.
  forall (marked)
    w−=<op>;
  fsub <op>: full subtract, with the right extension being treated as a carry (see sub).

```
forall {
    if (mark)
        w −= (<op> + right_w[m−2]));
    if (left_mark)
        w[m−2] = 0;
}
``` half [<op>]: for all marked cells, divide by 2 the register operand and store the result in w. No markers are affected.
  forall (marked)
    w={<op>[m−2:m−3], <op>[m−3:1]};
  fhalf [<op>]: full half; for all marked cells, divide by 2 the register operand and store the result in w, to which 100 . . . 0 is added if the least significant bit of the left cell is 1. Markers are not affected.
  forall (marked)
    w={<op>[m−2], left_w[0], <op>[m−3:1]};

lt <op>: less (or equal); for all marked cells, check whether register w holds a value that is less than, or equal to, that held in <op>; if w<op, then the w extension bit is set to 1; the marker bit is set to 0 if op>w.

```
forall (marked) {
    if (w < <op>)
        w[m−2] = 1;
    if (w > <op>)
        mark = 0;
}
``` flt <op>: full lt; for all marked cells where w<op or whose left neighbour has the w extension bit set to 1, set the extension bit to 1; the left extension bit is cleared and if w>op the marker is also cleared. This instruction is used in conjunction with test for comparisons on multiple consecutive cells.

```
forall {
    if (mark && (w < <op> || left_w[m-2]))
        w[m-2] = 1;
    if (right_mark)
        w[m-2] = 0;
    if (mark && w > op && !left_w[m-2])
        mark = 0;
}
``` gt <op>: greater (or equal); for all marked cells, check whether register w holds a value that is greater than, or equal to, that held in <op>; if w>op, then the w extension bit is set to 1; the marker bit is set to 0 if w<op.

```
forall (marked) {
    if (w > <op>)
        w[m-2] = 1;
    if (w < <op>)
        mark = 0;
}
``` fgt <op>: for all marked cells where w>op or whose left neighbour has the w extension bit set to 1, set the extension bit to 1; the left extension bit is cleared and if w<op the marker is also cleared. This instruction is used in conjunction with test for comparisons on multiple consecutive cells

```
forall {
    if (mark && (w > <op> || left_w[m-2]))
        w[m-2] = 1;
    if (right_mark)
        w[m-2] = 0;
    if (mark && w < op && !left_w[m-2])
        mark = 0;
}
``` test: For all marked cells containing a value equal to INR the marker bit is set to 0 and if the extension bit of the cell to the left is 1, then register w is assigned 11 . . . 1 and the extension bit of the cell to the left is cleared

```
forall {
    if (right_mark && right_w == INR)
        w[m-2] = 0;
    if (mark && w == INR && left_w[m-2])
        w = 11...1;
    else if (mark && w == INR)
        mark = 0;
}
``` and <op>: bitwise and; for all marked cells, do a bitwise and between register w and <op>. Markers are not affected.
  forall (marked)
  w &=<op>;

or <op>: bitwise or; for all marked cells, do a bitwise or between register w and <op>. Markers are not affected.
  forall (marked)
  w|=<op>;

xor <op>: bitwise xor; for all marked cells, do a bitwise xor between register w and <op>. Markers are not affected.
  forall (marked)
  w^=<op>;

Conditional Instructions

The following two instructions use an operand register, <r> (part of the RAM vector selected by the value generated to the input of VAR) and a m−1-bit value from INR.

<r>::=w (for register w)|r(RAM vector element)

cond <value>[<r>]: for all marked cells, check whether there is at least one bit set to 1 after executing a bitwise 'and' operation between the two operands.
  forall (marked)
  mark=((<r> & INR)!=0)? 1:0;

ncond <value>[<r>]: for all marked cells, check whether the result of executing a bitwise 'and' operation between the two operands is 0.
  forall (marked)
  mark=((<r> & IN)==0) ? 1: 0;

Index Instruction index: for all marked cells, register w is assigned the value of the cell's relative position with respect to the CM leftmost cell (which has index 0).

As can be seen from the foregoing descriptions and drawing figures, the present invention provides a novel way to process data in a manner which provides increased processing power with a substantial decrease in processing time, silicon area and power consumption. As discussed, the data processing system of the present invention provides for any given instruction and its operand(s) to be communicated, in parallel, to all CM cells, which execute the instruction within the same clock cycle.

Yet another inherent advantage of the data processing system of the present invention involves the ability of each cell within the cellular engine to not only simultaneously execute instructions within a single clock cycle, but to also dynamically limit those cells which execute these globally broadcast instructions via the utilization of both local and global state information. In particular, by utilizing marker bits on an individual cell level, the actual cells within the associative memory are capable of affecting those cells either to the left or right of marked cells in a manner which is heretofore unknown. Therefore, at the system level, the present invention provides for the selective activation, or alteration of the marked state, by associative mechanisms; that is, by the nature or property of the content of the individual cells within the CM 104, rather than a particular designated location address therein.

The present invention therefore combines processing and memory at a very intimate level, meaning that an individual cell of the CM 104 never has to access a separate memory block to do its job. Moreover, operands reside in their own local space at the cell level, therefore results are kept in place, saving communication and processing time, silicon area and power.

It should be noted that some instruction operands are, in fact, broadcast by the CC 100 at the same time as the instruction is globally broadcast.

While the invention had been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. A cellular engine for a data processing system, said engine comprising:
   an associative memory device having n-cells, each of said n-cells being able to store m bits;
   a vector memory containing p-vectors, each of said p-vectors having a storage capacity of n×m-bits;
   a control interconnection network that for each of said n-cells generates a classification code that classifies a cell in dependence upon a local state and a global state of said cell;
   an instruction register for accepting an instruction issued from a controller;
   a clock device for outputting a synchronizing clock signal comprised of a predetermined number of clock cycles per second, said clock device outputting said synchronizing clock signal to said associative memory device and said vector memory;
   and wherein said engine globally communicates said instruction to all of said n-cells simultaneously within one of said clock cycles, said instruction being executed in parallel by selected cells within said associative memory device, all within one of said clock cycles, in accordance with said classification of each of said n-cells by said control interconnection network.

2. The cellular engine for a data processing system according to claim 1, wherein:
   said instruction is executed in parallel by all of said n-cells within said associative memory device.

3. The cellular engine for a data processing system according to claim 1, further comprising:
   a data interconnection network that connects each cell to its right and left neighbors respectively.

4. The cellular engine for a data processing system according to claim 3, wherein:
   both of said data interconnection network and said control interconnection network are expandable.

5. The cellular engine for a data processing system according to claim 1, wherein:
   each of said n-cells includes a state field and a data field, said state field comprising a marker bit for encoding a local state of each of said n-cells; and
   wherein said maker bit is in one of a marked state and a non-marked state.

6. The cellular engine for a data processing system according to claim 5, wherein:
   said state field is modified using associative mechanisms as implemented by said execution of said instruction belonging to a specific subset of instructions.

7. The cellular engine for a data processing system according to claim 6, wherein:
   said data field is modified by executing logic and arithmetic instructions in said n-cells in accordance with said classification of each of said n-cells by said control interconnection network.

8. The cellular engine for a data processing system according to claim 1, wherein:
   each of said n-cells in said associative memory device actively processes data.

9. The cellular engine for a data processing system according to claim 1, wherein:
   each of said n-cells in said associative memory device includes a processing circuit.

10. The cellular engine for a data processing system according to claim 1, wherein said control interconnection network comprises a transcoder that classifies each of said n-cells using corresponding local and global states and a current instruction.

11. The cellular engine for a data processing system according to claim 10, wherein said transcoder classifies said n-cells into categories comprising a marked cell, a first marked cell, a last marked cell, a cell within stored limits, and an active cell.

12. An engine for a data processing system, said engine comprising:
   a memory device containing n-cells;
   a controller for selectively issuing an instruction to said memory device;
   a cell classification device which operates in association with a local state and a global state of each of said n-cells and generates for each of said n-cells a classification code based on local and global states of said cell;
   a clock device for outputting a synchronizing clock signal comprised of a predetermined number of clock cycles per second, said clock device outputting said synchronizing clock signal to said memory device and said controller; and
   wherein said engine globally communicates said instruction to all n-cells simultaneously, within one of said clock cycles; and
   wherein said instruction is executed by selected cells within said memory device in dependence upon at least said local state of said n-cells as directed by said cell classification device, said execution of said instruction occurring simultaneously in each of said selected cells within one of said clock cycles.

13. The engine for a data processing system according to claim 12, wherein:
   said instruction is executed by all of said n-cells within said memory device.

14. The engine for a data processing system according to claim 12, wherein:
   said memory device is not conventionally addressed.

15. The engine for a data processing system according to claim 12, wherein:
   said memory device is an associative memory device.

16. The engine for a data processing system according to claim 12, wherein:
   each of said n-cells includes a processing circuit.

17. The engine for a data processing system according to claim 16, wherein:
   said processing circuit has an accumulator.

18. The engine for a data processing system according to claim 12, wherein:
   each of said n-cells includes a field having a marker bit; and
   said local state reflects one of a marked state and a non-marked state of said marker bit.

19. The engine for a data processing system according to claim 18, wherein:
   said instruction is executed only within those n-cells having said marker bit set to said marked state.

20. The engine for a data processing system according to claim 12, wherein:
   said instruction is executed by selected cells within said memory device in dependence upon said local state and said global state of said n-cells as directed by said cell classification device, said execution of said instruction occurring simultaneously in each of said selected cells within one of said clock cycles.

21. The engine for a data processing system according to claim 20, wherein:
said global state utilized by said classification device is determined by said local states of all said n-cells.

22. The engine for a data processing system according to claim 20, wherein said cell classification device operates in association with corresponding local and global states of each of said n-cells and a current instruction to classify said n-cells into categories comprising a marked cell, a first marked cell, a last marked cell, a cell within stored limits, and an active cell.

23. The engine for a data processing system according to claim 12, wherein:
each of said n-cells includes a field having a plurality of marker bits.

24. The engine for a data processing system according to claim 12, wherein said cell classification device operates to transmit to each of said n-cells a corresponding classification code.

* * * * *